United States Patent
Liu et al.

(10) Patent No.: US 6,674,918 B1
(45) Date of Patent: Jan. 6, 2004

(54) IMAGE SYNTHESIS BY ILLUMINATING A VIRTUAL DEVIATION-MAPPED SURFACE

(75) Inventors: Wen-Yin Liu, Beijing (CN); Hua Zhong, Beijing (CN); Ying-Qing Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/505,227

(22) Filed: Feb. 16, 2000

(51) Int. Cl.$^7$ ............................ G06K 9/36; G06T 15/50
(52) U.S. Cl. .......................... 382/284; 345/426
(58) Field of Search ................................. 382/108, 154, 382/162, 253, 254, 274, 284, 289, 293, 294, 296; 345/426, 581, 582, 584, 589, 591, 593, 600, 629, 632

(56) References Cited

U.S. PATENT DOCUMENTS

| | | | | |
|---|---|---|---|---|
| 4,800,539 A | * | 1/1989 | Corn et al. | 367/72 |
| 6,057,850 A | * | 5/2000 | Kichury | 345/430 |
| 6,061,065 A | * | 5/2000 | Nagasawa | 345/427 |
| 6,226,007 B1 | * | 5/2001 | Brown | 345/426 |
| 6,407,744 B1 | * | 6/2002 | Van Overveld | 345/584 |

OTHER PUBLICATIONS

Horn, Berthold Klaus Paul, "Shape From Shading; A Method for Obtaining the Shape of a Smooth Opaque Object From One View," Submitted in Partial Fulfillment of the Reequirement for the Degree of Doctor of Philosophy at the Massachusetts Institute of Technology, Jun. 1970, pp. 1–196.

Phong, Bui Tuong, "Illumination for Computer Generated Pictures", Communications of the ACM, Jun. 1975, vol. 18, No. 6, pp. 311–317.

Cook, et al., "The Reyes Image Rendering Architecture", Computer Graphics, Jul. 1987, vol. 21, No. 4, pp. 95–102.

Witking, Andrew P., "Recovering Surface Shape and Orientation from Texture", Artificial Intelligence, 1981, pp. 17–45.

Blinn, James, F., "Simulation of Wrinkled Surfaces", pp. 286–292.

\* cited by examiner

*Primary Examiner*—Bhavesh M. Mehta
*Assistant Examiner*—Kanji Patel
(74) *Attorney, Agent, or Firm*—Lee & Hayes, PLLC (57) ABSTRACT

Methods and apparatus for synthesizing images from two or more existing images are described. The described embodiment makes use of an illumination model as a mathematical model to combine the images. A first of the images is utilized as an object color or color source (i.e. the foreground) for a resultant image that is to be formed. A second of the images (utilized as the background or texture) is utilized as a perturbation source. In accordance with the described embodiment, the first image is represented by a plane that has a plurality of surface normal vectors. Aspects of the second image are utilized to perturb or adjust the surface normal vectors of the plane that represents the first image. Perturbation occurs, in the described embodiment, by determining individual intensity values for corresponding pixels of the second image. The intensity values are mapped to corresponding angular displacement values. The angular displacement values are used to angularly adjust or deviate the surface normal vectors for corresponding image pixels of the plane that represents the first image. This yields a virtual surface whose normal vectors are not fully specified, but constrained only by the angles between the original surface normal vectors and the perturbed normal vectors. In the described embodiment, after some assumptions concerning the viewing and lighting source direction, an illumination model is then applied to the virtual surface to yield a resultant synthesized image.

38 Claims, 4 Drawing Sheets

Fig. 6 ns according to the combination types, which may be "A over B", "A XOR B", etc. The method is useful for computer animation, e.g., fade in-out and dissolve effects. Despite continuing work in the field, however, techniques such as the one described above, and others, still fall short of providing rendered images that are realistically artistic and that accurately reflect the intentions of their author.

IMAGE SYNTHESIS BY ILLUMINATING A VIRTUAL DEVIATION-MAPPED SURFACE

TECHNICAL FIELD

This invention relates to image synthesis techniques and apparatus. More particularly, the invention concerns synthesizing an image from two or more images.

BACKGROUND

Image synthesis techniques refer to computer-implemented techniques that involve rendering an image, such as a digital image, from two or more other images. Although image synthesis can refer to and include techniques in computer graphics that deal with generating realistic images of geometric models (such as textured 3-dimensional objects represented in 2-dimensional space), at issue in the present case is image synthesis as such refers to image fusion, or the combining of two existing images to generate a third image.

Images that are generated by a computer using image fusion/combination techniques are typically realistic and/or artistic images with some special effect, such as texturing, that has been added in by virtue of a fusion/combination technique. A continuing challenge to those who design and use image synthesis systems is to provide rendered images that are realistic, meaningful, and reflect the creativity of the author who has rendered the image. Presently, however, known image synthesis techniques fall short of the goal of providing a truly versatile, realistic and meaningful rendering.

Exemplary techniques that are currently used include so-called "blending" techniques. Blending typically involves simply merging one image into another using any of a number of known merging techniques. Blending is one of the simplest methods of image combination or synthesis, but typically results in a rendered image that has no meaning, or even less meaning than the images from which it was rendered. For example, the merging of the two images may reduce the resolution, clarity or character of the resultant formed image. Needless to say, this is highly undesirable.

Other more complicated image synthesizing techniques do exist, but they continue to be plagued by problems associated with the quality and character of the images that are ultimately rendered by the techniques. In addition, many of these techniques are time-consuming and computationally complicated. Such image synthesizing techniques can include pixel-wise operations (e.g., simple color blending) and window operations (e.g., filtering operations) to name just a few. Among these particular techniques is a digital image synthesis method proposed by Porter and Duff in an article entitled *Compositing Digital Images*, SIGGRAPH'84, pp. 253–259 (1984). The proposed method generates a resultant image in a pixel-wise manner. According to the method, each pixel value of an original image should contain RGB (Red, Green, Blue) components, as well as an additional α component. The α component of the pixel is used to specify the transparence (diaphaneity) of the pixel. The result of the image fusion or synthesis technique is a linear combination of the images involved in the fusion/combination. All components (including the RGB components and the α component) of the resulting pixels is a weighted average of corresponding components of the two images. The weights are linear functions of the α components according to the combination types, which may be "A Accordingly, this invention arose out of concerns associated with improving the techniques and apparatus associated with image synthesis.

SUMMARY

Methods and apparatus for synthesizing images from two or more existing images are described. The described embodiment makes use of an illumination model as a mathematical model to combine the images. A first of the images is utilized as an object color or color source (i.e. the foreground) for a resultant image that is to be formed. A second of the images (utilized as the background or texture) is utilized as a perturbation source. In accordance with the described embodiment, the first image is represented by a plane that has a plurality of surface normal vectors. Aspects of the second image are utilized to perturb or adjust the surface normal vectors of the plane that represents the first image. Perturbation occurs, in the described embodiment, by determining individual intensity values for corresponding pixels of the second image. The intensity values are mapped to corresponding angular displacement values. The angular displacement values are used to angularly adjust or deviate the surface normal vectors for corresponding image pixels of the plane that represents the first image. This yields a virtual surface whose normal vectors are not fully specified, but constrained only by the angles between the original surface normal vectors and the perturbed normal vectors. In the described embodiment, after some assumptions concerning the viewing and lighting source direction, an illumination model is then applied to the virtual surface to yield a resultant synthesized image.

DETAILED DESCRIPTION

Overview

Aspects of the inventive methods and systems provide improved image synthesizing techniques that, in addition to providing superior renderings, are computationally simpler and faster than currently used methods. The techniques taught herein have wide applicability in the field of computer graphics, particularly where it is desired to synthesize images having so-called "special effects". For example, the described techniques have been utilized to render "wall painting" images which effectively superimpose a picture over a wall texture (such as a brick wall), such that the resultant image truly looks as if a picture were painted on the wall. In addition, the described techniques have been utilized to render images that have a deep color embossed effect (such as a 3-dimensional font and carved stone effects). Further, the described techniques have been utilized to render realistically-appearing "impressionism" effects which are generated by superimposing an image on its shifted copy. Still further, renderings have been created that have a "cashmere" effect which is generated by superimposing an image on a textile texture.

In the described embodiment, an illumination model is utilized as a mathematical model to combine two or more existing images. The illumination model is used as the operator, and the two images are used as the operands. Any suitable illumination model can be utilized, with an exemplary illumination model being described in detail below.

In order to render the synthesized image using the illumination model, one must typically have enough information about an image's surface. However, complete surface information is very difficult, if not impossible in most cases, to calculate from a single image of an object or scene. Since, in the present case, we are concerned with using image synthesis to render an image from separate single images, the inventive methods provide approaches to doing so using only partial information that describes an image's surface. To assist in rendering a synthesized image, the described embodiment utilizes the concept of a "virtual surface". The surface is considered "virtual" because all of the surface information that is necessary to fully appreciate the surface is not known or, in some cases, cannot be discovered from a single image. Accordingly, in the described embodiment, certain assumptions are made concerning the virtual surface that allow the illumination model to be applied thereto to render a synthesized image.

Figure 1:
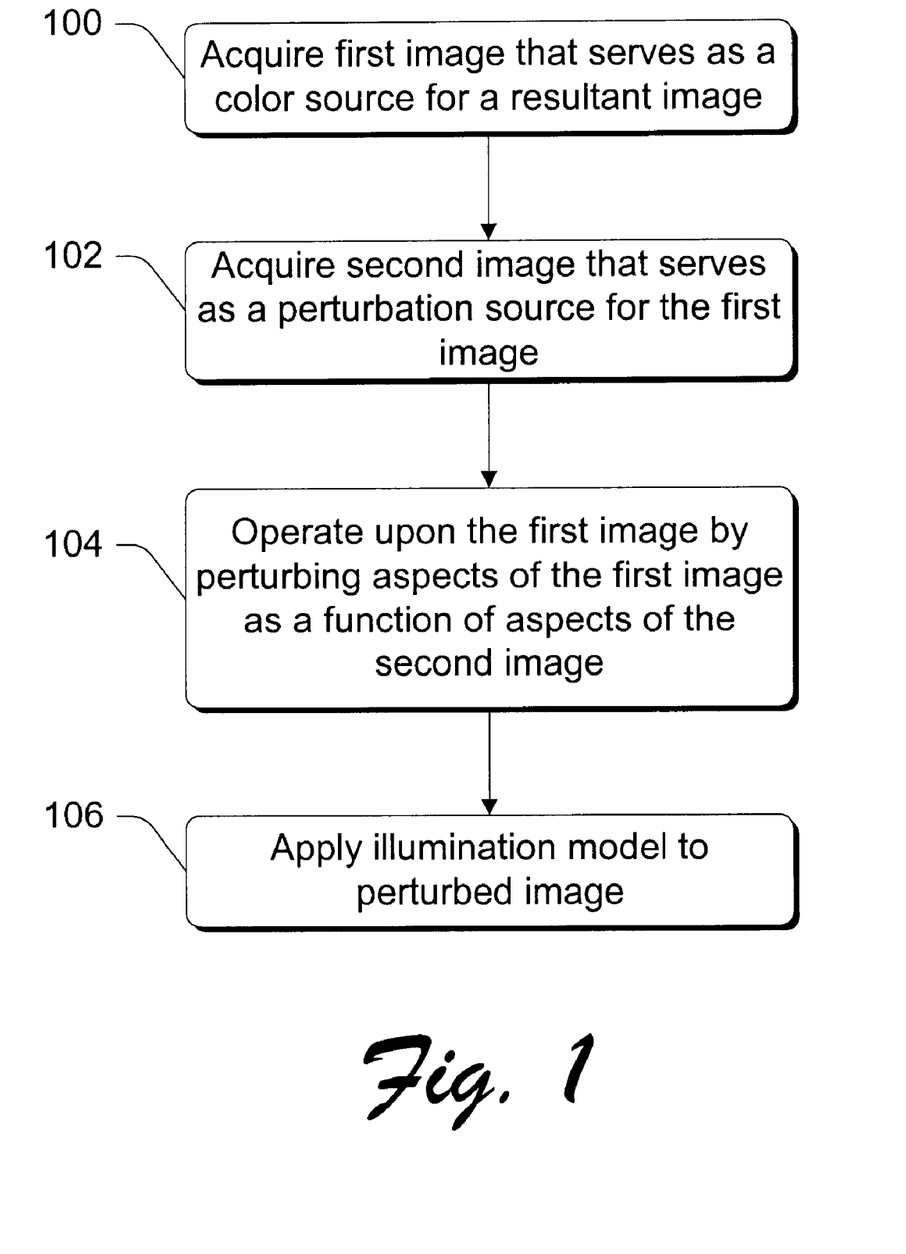
FIG. 1 is a flow diagram that describes steps in a method in accordance with the described embodiment.

FIG. 1 shows a flow diagram that describes processing steps in accordance with the described embodiment. The described steps can be implemented in any suitable hardware, software, firmware, or combination thereof that can typically be used for image synthesis.

Step 100 acquires a first image that serves as a color source (i.e. foreground) for a resultant synthesized image that is to be formed. Step 102 acquires a second image that serves as a perturbation source for the first image. Acquisition of the first and second images can take place through conventionally known techniques that are typically utilized in image synthesis. As an example, the first image might be an image of a photograph or painting, and the second image might be a textured pattern such as a brick wall. Step 104 operates upon the first image by perturbing aspects of the first image as a function of aspects of the second image. This provides a so-called "perturbed image" or virtual surface. Step 106 then applies an illumination model to the perturbed image or virtual surface to provide a resultant synthesized image.

In the described embodiment, a virtual surface is obtained by first representing the first image as a plane that has a plurality of surface normal vectors (or surface normals). Each of the surface normals is perturbed or deviated in accordance with an intensity aspect of the second image. In the described example, perturbation takes place by determining the intensity of corresponding portions of the second image to provide a plurality of intensity values. The intensity values are then used to define angular displacement values.

In the described embodiment, the angular displacement values are defined by mapping the intensity values to offset angles. The offset angles are then used to adjust or deviate the normals of the plane that represents the first image. Deviation in this manner provides a deviation-mapped virtual "rough" surface on which the normal perturbation at a specific point or pixel is determined by the intensity of the corresponding point or pixel on the second image. An illumination model is then applied to the virtual surface to accordingly illuminate it and provide a resultant synthesized image.

Exemplary Computer System

Figure 2:
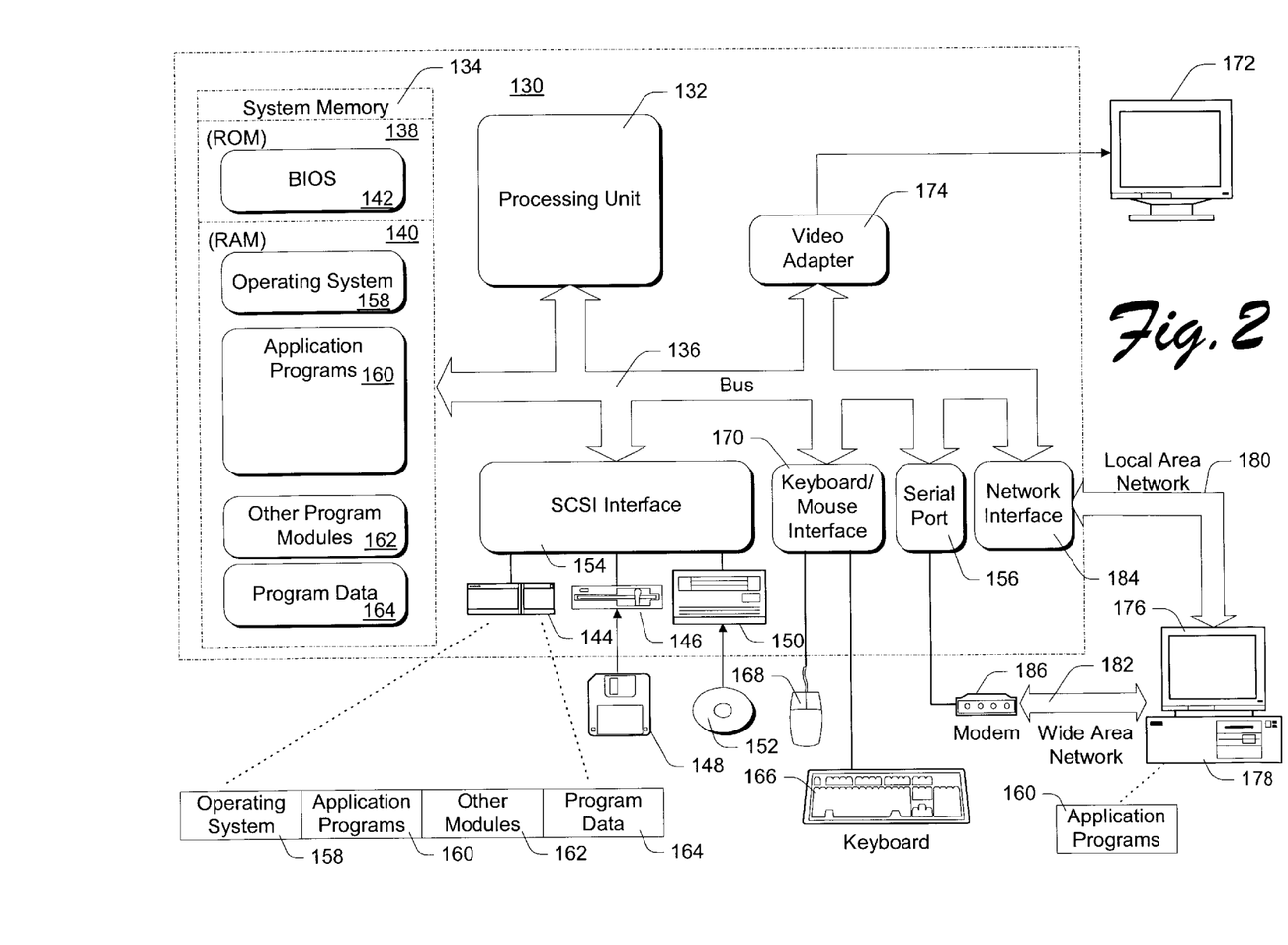
FIG. 2 illustrates an exemplary computer system that can be utilized to implement an image synthesis apparatus in accordance with the described embodiment.

FIG. 2 shows but one example of a computer 130 that can be used to implement an image synthesizer in accordance with the described embodiment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash it memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162 (such as one or more image synthesizing programs), and program data 164. A user may enter commands and information into computer 130 through input devices such as a keyboard 166 and a pointing device 168. Other input devices (not shown) may include a microphone, joystick, game pad, satellite dish, scanner, or the like. The input devices enable images to be digitized in a conventional manner, and used in accordance with the described embodiment. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Embodiment

Figure 3:
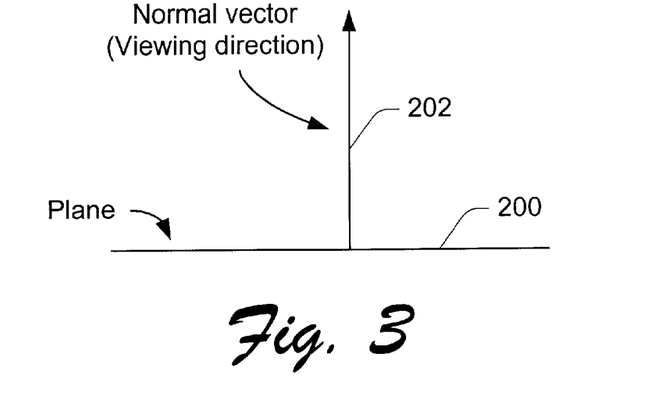
FIG. 3 illustrates an exemplary plane that is used to represent a first image, and an exemplary normal vector in accordance with the described embodiment.
Figure 4:
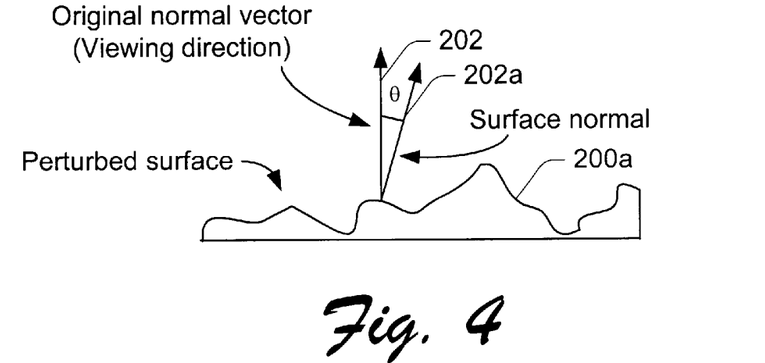
FIG. 4 illustrates the FIG. 3 plane having been deviated or perturbed in accordance with the described embodiment to provide a virtual perturbed surface.
Figure 5:
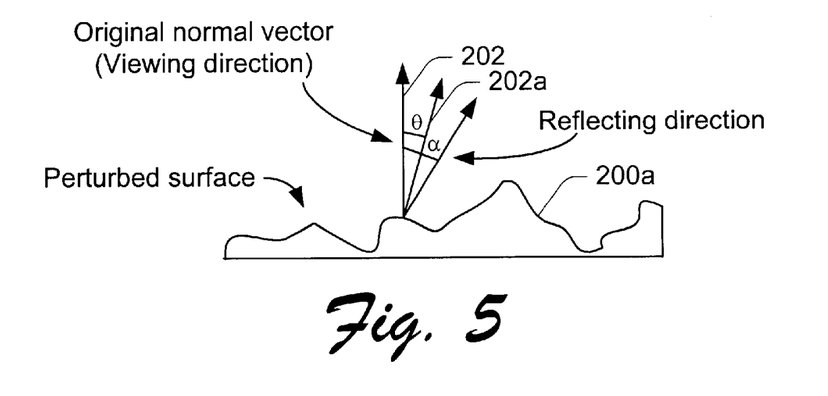
FIG. 5 illustrates the FIG. 4 surface in accordance with a specific illumination model that has been applied to the FIG. 4 virtual perturbed surface.
Figure 6:
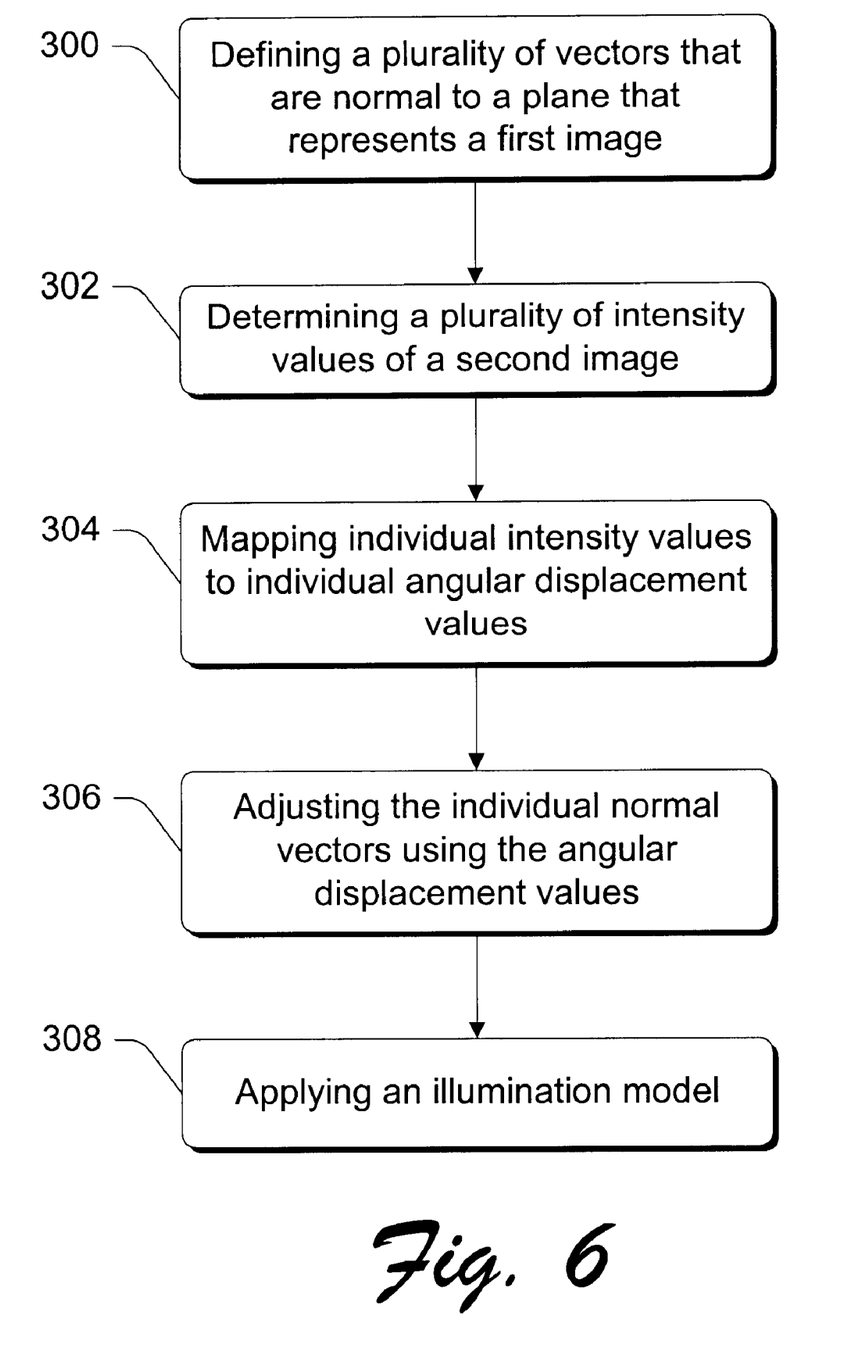
FIG. 6 is a flow diagram that describes steps in a method in accordance with the described embodiment.

For the discussion that follows, reference is made to FIGS. 3–6. FIGS. 3–5 are described in parallel with the processing steps that are depicted in FIG. 6. Step 300 (FIG. 6) defines a plane that represents or models a first of the images that are to be used to synthesize an image. The first image can be an image of a photograph, painting, or the like. FIG. 3 shows an exemplary surface 200 in the form of the plane that represents the first image. The first image is used as the object color of the planar surface 200. In the illustrated example, surface 200 is orthogonal to the viewing direction. Step 300 also defines a plurality of parallel vectors which, in this example, are normal to the surface of plane 200. An exemplary normal vector is shown at 202. In the described embodiment, a normal vector is defined for each pixel of the first image. Definition of the normal vectors can take place through the use of known vector-defining techniques commonly employed in computer graphics.

Referring to FIG. 4, surface 200 is perturbed to define a generally non-planar intermediate surface 200a. Surface 200a is perturbed by adjusting or deviating at least some of the individual defined vectors, i.e. vector 202, away from their original dispositions. An exemplary deviated vector is shown at 202a. In the illustrated and described embodiment, intensity aspects of a second of the images (say, for example, an image of a textured pattern that is desired to be imparted into the first image) are used as a perturbation source. Specifically, in this example, the extent to which a normal at a specific point or pixel is perturbed is determined as a function of the measured intensity of a corresponding pixel in a second of the images. Accordingly, step 302 (FIG. 6) determines a plurality of intensity values of the second image. Intensity values can be measured in any conventional way. The intensity values are then used to define corresponding angular displacement values which, in turn, are used to angularly deviate the plane normals of FIG. 3. In the illustrated example, the intensity values are linearly mapped (step 304) to corresponding angular displacement values. In the described embodiment, there are 256 measurable intensity values that range from 0–255. Individual values are linearly mapped to an angle $\theta$ (i.e. the angular displacement value) having values from between 0–90 degrees. Linear mapping can take place by maintaining a lookup table of angular displacement values and finding the appropriate displacement value given an intensity value. Once the angular displacement values are known, step 306 adjusts the individual normal vectors of FIG. 3 using the angular displacement values. Hence, the angle $\theta$ represents the angular displacement between the original plane normal (FIG. 3) and the new displaced normal 202a. In this example, displacement or deviation of the plane normals takes place on a pixel-by-pixel basis.

In this particular example, deviation of the plane normals for each pixel of the represented image creates a perturbed virtual surface 200a (FIG. 4). This surface is virtual because the deviated normals are not fully specified. Specifically, in the perturbation process, only the angular displacement values are known (i.e. the direction of the subsequently-deviated normal is not known). Accordingly, the deviated normals are constrained only by their angular displacement values.

With the virtual surface 200a having been created as described above, step 308 applies an illumination model to the virtual surface to provide a resultant synthesized third image. Any suitable illumination model can be used, assuming that appropriate assumptions about the virtual surface can be made. Recall that because the surface is virtual, all of the information that is necessary to fully appreciate the surface may not and, in some cases, cannot be known. Hence, application of the illumination model can require certain assumptions to be made.

In the illustrated and described example, an illumination model known as the "Phong model" is utilized and applied to the virtual surface. The "Phong model" is described in an article authored by Bui-Tuong, Phong entitled *Illumination for Computer Generated Pictures,* CACM, 18(6), June 1975, pp. 311–317 and is discussed in more detail below.

The Phong illumination model is described by the following equation:

$$I_\lambda = I_{a\lambda} k_a O_{d\lambda} + I_{p\lambda} [k_d O_{d\lambda} \cos\theta + W(\theta) \cos^n \alpha]$$

where:

I is the resultant image intensity,

λ is the color channel (i.e. one of Red, Green or Blue)

θ is the angle between a lighting direction and an adjusted normal of the intermediate or virtual surface, α is the angle between the viewing direction and a reflecting direction, $I_a$ is the ambient light, $I_p$ is the lighting color, and $O_d$ is the color of the first image (the foreground image).

In applying the Phong model to the virtual surface of FIG. 4, the following assumption is made: the lighting source direction, the viewing direction, and the original plane's normals are all parallel. With this assumption, the α parameter in the above equation can be calculated as α=2θ. Given this assumption, the Phong model can then be applied to the virtual surface to provide a resultant synthesized image. A representation of the Phong model's application to the virtual surface of FIG. 4 is shown in FIG. 5. There, it is seen that α=2θ. The $I_p$ parameter can take on the value of white light, or can be some other tunable value. In addition, other parameters of this equation can be constants, or can be tunable.

The inventive methods and systems described above can be used to generate improved synthesized images from two or more separate images. Various artistic effects such as wall painting, deep color embossing, impressionism, and cashmere painting can be generated in a more efficient and effective manner. The use of a virtual surface to represent two images that are to be synthesized into a third image, along with various assumptions that can be made, greatly simplifies application of the illumination model to provide the ultimately rendered image. And, while the second image can be a different image, it can also be a transformed version of the first image. For example, the second image can be an intermediate image that is generated from the first image, e.g. an embossed image using a simple edge operator.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented method of synthesizing an image from at least two other images comprising:

acquiring a first image that serves as a color source for a resultant image which is to be formed;

acquiring a second image which serves as a perturbation source for the first image;

operating upon a plane that represents the first image by angularly perturbing vectors associated with the plane that represents the first image as a function of aspects of the second image to provide a perturbed image; and applying an illumination model to the perturbed image to provide a resultant synthesized image.

2. The computer-implemented method of claim 1, wherein said perturbing comprises deviation-mapping intensity values associated with the second image to angular displacement values that are used to angularly perturb individual vectors associated with the plane that represents the first image.

3. The computer-implemented method of claim 1, wherein said aspects of the second image comprise intensity aspects of the second image.

4. The computer-implemented method of claim 1, wherein said operating comprises operating upon the first image on a pixel-by-pixel basis.

5. The computer-implemented method of claim 1, wherein said perturbing comprises:

defining a plurality of vectors that are normal to a surface of the plane that represents the first image; and angularly adjusting the individual vectors by individual amounts that are functions of aspects of the second image.

6. The computer-implemented method of claim 5, wherein the individual amounts by which the individual vectors are adjusted are functions of the intensity of the second image.

7. The computer-implemented method of claim 6 wherein said angularly adjusting takes place on a pixel-by-pixel basis.

8. The computer-implemented method of claim 1, wherein the perturbed image comprises a virtual surface.

9. One or more computer-readable media having computer-readable instructions thereon which, when executed by a computer, implement the method of claim 1.

10. A computer-implemented method of synthesizing an image from at least two other images comprising:

defining a plurality of normals relative to a surface that represents a first image;

angularly adjusting individual normals by an amount that is a function of the intensity of individual corresponding portions of a second image to provide an intermediate surface; and applying an illumination model to the intermediate surface to provide a resultant synthesized image.

11. The computer-implemented method of claim 10 wherein said adjusting comprises providing the intermediate surface as a virtual surface.

12. The computer-implemented method of claim 10 wherein said adjusting comprises:

determining an intensity value for each individual normal that is to be adjusted;

mapping individual intensity values to individual angular displacement values; and adjusting the individual normals by corresponding associated angular displacement values.

13. The computer-implemented method of claim 12 wherein the individual adjusted normals are constrained only by their corresponding associated angular displacement values.

14. The computer-implemented method of claim 10 wherein said adjusting comprises deviation-mapping the surface that represents the first image.

15. The computer-implemented method of claim 10 further comprising prior to applying the illumination model, assuming that a lighting direction and a viewing direction are the same or parallel.

16. One or more computer-readable media having computer-readable instructions thereon which, when executed by a computer, cause the computer to implement the method of claim 10.

17. A computer-implemented method of synthesizing an image from at least two other images comprising:

creating a virtual surface that represents first and second images that are desired to be synthesized into a third image, the virtual surface having a plurality of normal vectors and angles that are associated with the normal vectors, the angles being a function of intensity values that are associated with one of the first and second images; and applying an illumination model to the virtual surface to provide a synthesized third image.

18. The computer-implemented method of claim 17, wherein said creating comprises:
defining a plane that represents the first image, the plane having a plurality of parallel normals;
measuring intensity values of the second image;
mapping measured intensity values to corresponding angular displacement values; and
angularly displacing individual normals of the parallel normals by individual angular displacement values.

19. One or more computer-readable media having computer-readable instructions thereon which, when executed by a computer, implements the method of claim 17.

20. A computer-implemented method of synthesizing an image from at least two other images comprising:
acquiring a first image that is to serve as a color source for a resultant image to be formed;
defining a plane which represents a surface of the first image;
adjusting a plurality of normals to the plane by an amount which is a function of an aspect of a second image that serves as a texture source for the resultant image to be formed, said adjusting providing a virtual surface; and
applying an illumination model to the virtual surface to provide a resultant synthesized image.

21. The computer-implemented method of claim 20, wherein the aspect of the second image comprises an intensity aspect.

22. The computer-implemented method of claim 20, wherein said adjusting of the normals comprises:
measuring one or more intensity values relative to the second image;
mapping the intensity values to one or more angular displacement values; and
applying angular displacement values to individual normals of the plurality of normals.

23. A programmed image synthesizer comprising:
memory;
one or more processors; and
software code resident in the memory which, when executed by the one or more processors, causes the processors to implement the following method:
defining a plurality of vectors relative to a surface that represents a first image that is to be used in an image synthesis process;
determining a plurality of intensity values of a second image which is to be used in the image synthesis process;
mapping individual intensity values to individual angular displacement values;
using the individual angular displacement values to angularly adjust individual vectors of the plurality of vectors to provide a virtual deviation-mapped surface; and
applying an illumination model to the virtual deviation-mapped surface to provide a synthesized third image of the first and second images.

24. One or more computer-readable media having computer-readable instructions thereon which, when executed by a computer, cause the computer to implement the following method:
defining a plurality of normal vectors relative to a plane that represents a first image that is to be used in an image synthesis process;
determining a plurality of intensity values of a second image which is to be used in the image synthesis process;
mapping individual intensity values to individual angular displacement values;
using the individual angular displacement values to angularly adjust individual normal vectors of the plurality of vectors to provide a virtual perturbed surface; and
applying an illumination model to the virtual perturbed surface to provide a synthesized third image of the first and second images.

25. A computer program on a computer readable medium which implements the following method:
defining a plurality of normal vectors relative to a plane that represents a first image that is to be used in an image synthesis process;
determining a plurality of intensity values of a second image which is to be used in the image synthesis process;
mapping individual intensity values to individual angular displacement values;
using the individual angular displacement values to angularly adjust individual normal vectors of the plurality of vectors to provide a virtual perturbed surface; and
applying an illumination model to the virtual perturbed surface to provide a synthesized third image of the first and second images, the illumination model comprising the following model, where the lighting direction and viewing direction are assumed to be parallel:

$$I_\lambda = I_{a\lambda} k_a O_{d\lambda} + I_{p\lambda} [k_d O_{d\lambda} \cos\theta + W(\theta) \cos^n \alpha]$$

where:
I is the resultant image intensity,
$\lambda$ is the color channel,
$\theta$ is the angle between a lighting direction and an adjusted normal vector,
$\alpha$ is the angle between the viewing direction and a reflecting direction,
$I_a$ is the ambient light,
$I_p$ is the lighting color, and
$O_d$ is the color of the first image.

26. A computer-implemented method of synthesizing an image from at least two other images comprising:
defining a plurality of normals relative to a surface that represents a first image;
adjusting individual normals by an amount that is a function of the intensity of individual corresponding portions of a second image to provide an intermediate surface; and
applying an illumination model to the intermediate surface to provide a resultant synthesized image, wherein said applying of the illumination model comprises applying the following model:

$$I_\lambda = I_{a\lambda} k_a O_{d\lambda} + I_{p\lambda} [k_d O_{d\lambda} \cos\theta + W(\theta) \cos^n \alpha]$$

where:
I is the resultant image intensity,
$\lambda$ is the color channel,
$\theta$ is the angle between a lighting direction and an adjusted normal of the intermediate surface,
$\alpha$ is the angle between the viewing direction and a reflecting direction, $I_a$ is the ambient light,
$I_p$ is the lighting color, and
$O_d$ is the color of the first image.

27. The computer-implemented method of claim 26 wherein said adjusting comprises providing the intermediate surface as a virtual surface.

28. The computer-implemented method of claim 26 wherein said adjusting comprises:
   determining an intensity value for each individual normal that is to be adjusted;
   mapping individual intensity values to individual angular displacement values; and
   adjusting the individual normals by corresponding associated angular displacement values.

29. The computer-implemented method of claim 28 wherein the individual adjusted normals are constrained only by their corresponding associated angular displacement values.

30. The computer-implemented method of claim 26 wherein said adjusting comprises deviation-mapping the surface that represents the first image.

31. The computer-implemented method of claim 26 further comprising prior to applying the illumination model, assuming that a lighting direction and a viewing direction are the same or parallel.

32. One or more computer-readable media having computer-readable instructions thereon which, when executed by a computer, cause the computer to implement the method of claim 26.

33. A computer-implemented method of synthesizing an image from at least two other images comprising:
   acquiring a first image that is to serve as a color source for a resultant image to be formed;
   defining a plane which represents a surface of the first image;
   adjusting a plurality of normals to the plane by an amount which is a function of an aspect of a second image that serves as a texture source for the resultant image to be formed, said adjusting providing a virtual surface; and
   applying an illumination model to the virtual surface to provide a resultant synthesized image, wherein said applying comprises applying the following illumination model:

$$I_\lambda = I_{a\lambda} k_a O_{d\lambda} + I_{p\lambda} [k_d O_{d\lambda} \cos\theta + W(\theta) \cos^n \alpha]$$

where:
   I is the resultant image intensity,
   $\lambda$ is the color channel,
   $\theta$ is the angle between a lighting direction and an adjusted normal,
   $\alpha$ is the angle between the viewing direction and a reflecting direction,
   $I_a$ is the ambient light,
   $I_p$ is the lighting color, and
   $O_d$ is the color of the first image.

34. The computer-implemented method of claim 33, wherein the aspect of the second image comprises an intensity aspect.

35. The computer-implemented method of claim 33 wherein said adjusting of the normals comprises:
   measuring one or more intensity values relative to the second image;
   mapping the intensity values to one or more angular displacement values; and
   applying angular displacement values to individual normals of the plurality of normals.

36. A computer-implemented method comprising:
   creating a perturbed virtual surface that represents a first image having been perturbed through angular adjustments of vectors associated with a surface that represents the first image, individual angular adjustments being computed as a function of intensity values associated with a second image; and
   applying an illumination model to the virtual surface to provide a resultant third image.

37. The computer-implemented method of claim 36 wherein individual directions of angularly-adjusted vectors is not known.

38. A programmed image synthesizer comprising:
   memory;
   one or more processors; and
   software code resident in the memory which, when executed by the one or more processors, causes the processors to implement the following method:
      defining a plurality of vectors relative to a surface that represents a first image that is to be used in an image synthesis process;
      determining a plurality of intensity values of a second image which is to be used in the image synthesis process;
      mapping individual intensity values to individual angular displacement values;
      using the individual angular displacement values to angularly adjust individual vectors of the plurality of vectors to provide a virtual deviation-mapped surface; and
      applying an illumination model to the virtual deviation-mapped surface to provide a synthesized third image of the first and second images, wherein said applying comprises applying the following illumination model, where the lighting direction and viewing direction are assumed to be parallel:

$$I_\lambda = I_{a\lambda} k_a O_{d\lambda} + I_{p\lambda} [k_d O_{d\lambda} \cos\theta + W(\theta) \cos^n \alpha]$$

where:
         I is the resultant image intensity,
         $\lambda$ is the color channel,
         $\theta$ is the angle between a lighting direction and an adjusted vector,
         $\alpha$ is the angle between the viewing direction and a reflecting direction,
         $I_a$ is the ambient light,
         $I_p$ is the lighting color, and
         $O_d$ is the color of the first image.

* * * * *

UNITED STATES PATENT AND TRADEMARK OFFICE
CERTIFICATE OF CORRECTION

PATENT NO. : 6,674,918 B1
DATED : January 6, 2004
INVENTOR(S) : Liu et al.

It is certified that error appears in the above-identified patent and that said Letters Patent is hereby corrected as shown below:

<u>Column 4,</u>
Line 47, delete "it" between "flash" and "memory".

Signed and Sealed this

Twentieth Day of April, 2004

JON W. DUDAS
*Acting Director of the United States Patent and Trademark Office*